United States Patent
Fishman et al.

(10) Patent No.: US 7,117,266 B2
(45) Date of Patent: Oct. 3, 2006

(54) METHOD FOR PROVIDING USER-APPARENT CONSISTENCY IN A WIRELESS DEVICE

(75) Inventors: Dan Fishman, Saratoga, CA (US); Greg Buzzard, Aptos, CA (US); Hans Wolters, Mountain View, CA (US); Sougata Mukherjea, San Jose, CA (US); Charles Paclat, Medford, MA (US)

(73) Assignee: BEA Systems, Inc., San Jose, CA (US)

( * ) Notice: Subject to any disclaimer, the term of this patent is extended or adjusted under 35 U.S.C. 154(b) by 797 days.

(21) Appl. No.: 09/949,912

(22) Filed: Sep. 10, 2001

(65) Prior Publication Data

US 2003/0018887 A1    Jan. 23, 2003

Related U.S. Application Data (60) Provisional application No. 60/306,129, filed on Jul. 17, 2001.

(51) Int. Cl.
*G06F 15/16* (2006.01)
(52) U.S. Cl. .................. 709/228; 709/213; 709/217
(58) Field of Classification Search ............... 370/401; 455/432.1; 709/227–228, 246; 713/201
See application file for complete search history.

(56) References Cited

U.S. PATENT DOCUMENTS

| | | | | |
|---|---|---|---|---|
| 5,159,592 A * | 10/1992 | Perkins | ........................ | 370/401 |
| 5,250,789 A | 10/1993 | Johnsen | ........................ | 235/383 |
| 5,566,225 A | 10/1996 | Haas | ........................ | 455/423 |
| 5,664,110 A | 9/1997 | Green et al. | ........................ | 705/26 |
| 5,727,159 A | 3/1998 | Kikinis | ........................ | 709/246 |
| 5,812,819 A * | 9/1998 | Rodwin et al. | ........................ | 713/201 |
| 6,101,483 A | 8/2000 | Petrovich et al. | ........................ | 705/26 |
| 6,112,212 A | 8/2000 | Heitler | ........................ | 715/501.1 |
| 6,128,661 A | 10/2000 | Flanagin et al. | ........................ | 709/227 |
| 6,177,905 B1 | 1/2001 | Welch | ........................ | 342/357.13 |
| 6,233,608 B1 | 5/2001 | Laursen et al. | ........................ | 709/217 |
| 6,236,768 B1 | 5/2001 | Rhodes et al. | ........................ | 382/306 |
| 6,314,406 B1 | 11/2001 | O'Hagan et al. | ........................ | 705/14 |
| 6,430,624 B1 * | 8/2002 | Jamtgaard et al. | ........................ | 709/246 |
| 6,542,740 B1 * | 4/2003 | Olgaard et al. | ........................ | 455/432.1 |
| 6,567,661 B1 | 5/2003 | McDonnell et al. | ........................ | 340/870.07 |
| 6,571,279 B1 | 5/2003 | Herz et al. | ........................ | 709/227 |
| 6,647,001 B1 * | 11/2003 | Bhagavath et al. | ........................ | 370/401 |

(Continued)

OTHER PUBLICATIONS

U.S. Appl. No. 09/949,594, filed Sep. 10, 2001, Dan Fishman et al.

(Continued)

*Primary Examiner*—Patrice Winder
(74) *Attorney, Agent, or Firm*—Fliesler Meyer LLP (57) ABSTRACT

A method for providing user-apparent consistency in a wireless user device is presented. An IP address, or other unique identifier, is assigned to a wireless user device in wireless communication with a wireless application server. The IP address is associated with a communication session between the wireless user device and the wireless application server. The IP address, along with information related to the communication session, such as context information, is stored by the wireless application server, such as in an active session cache. The wireless user device may then rejoin the communication session in the event the wireless communication is temporarily dropped and re-established between the wireless user device and the wireless application server, without losing the assignment of the IP address to the wireless user device or any information stored for the IP address in the active session cache.

31 Claims, 5 Drawing Sheets

U.S. PATENT DOCUMENTS

| | | |
|---|---|---|
| 6,760,758 B1 * | 7/2004 | Lund et al. ............... 709/228 |
| 6,813,641 B1 | 11/2004 | Fomenko et al. ........... 709/230 |
| 6,865,680 B1 * | 3/2005 | Wu et al. .................. 713/201 |
| 2002/0099829 A1 | 7/2002 | Richards et al. |

OTHER PUBLICATIONS

U.S. Appl. No. 09/950,192, filed Sep. 10, 2001, Dan Fishman et al.

*Wired on Wireless: A New Class of 802.11 Devices Go the Distance*, Dave Molta, Mar. 22, 1999.

*HomeRF Working Group Unveils Faster Standard for Multimedia Wireless Networks*, Ann Cheney, May 2, 2001.

*Infrared Data Association (IrDA) Demonstrates Future of Payment Technology at 2001 CES show*, Lawrence Faulkner, Jan. 4, 2001.

*Toshiba and Red-M Focus on Bluetooth Development*, By Los Angeles Newsroom, Wireless NewsFactor, Nov. 13, 2000.

*Zoom Zoom—Red-M Speeds 3G Bluetooth Services*, by Dan McDonough, Jr., Part of the NewsFactor Network, Jun. 4, 2001.

* cited by examiner

METHOD FOR PROVIDING USER-APPARENT CONSISTENCY IN A WIRELESS DEVICE

CLAIM OF PRIORITY

This application claims priority to U.S. Provisional patent application No. 60/306,129, filed Jul. 17, 2001, entitled METHOD FOR PROVIDING USER-APPARENT CONSISTENCY IN A WIRELESS DEVICE, incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

The following applications are cross-referenced and incorporated herein by reference:

U.S. patent application Ser. No. 09/949,594 entitled "SHORT-RANGE WIRELESS ARCHITECTURE," inventors Dan Fishman, Greg Buzzard, Hans Wolters, Sougata Mukherjea, and Charles Paclat, filed concurrently herewith.

U.S. patent application Ser. No. 09/950,192 entitled "A METHOD FOR MARKETING AND SELLING PRODUCTS TO A USER OF A WIRELESS DEVICE," inventors Dan Fishman, Greg Buzzard, Hans Wolters, Sougata Mukherjea, and Charles Paclat, filed concurrently herewith.

FIELD OF THE INVENTION

The invention relates generally to short-range wireless systems and specifically to a short range wireless architecture for allowing wireless user devices to communicate with back-end servers.

BACKGROUND OF THE INVENTION

Wireless technologies can generally be divided into two categories: wide-area and short-range wireless technologies. Current wide-area wireless technologies derive from the on-going evolution and packet-oriented digitalization of the cellular phone network, including devices such as cell phones. Short-range devices are those which typically require a tower or antenna in close proximity, such as within 30 meters or so. These short-range technologies typically act as proximate networks. A significant class of proximate networking is often referred to as "ad-hoc" networking, meaning the network may be formed in an ad-hoc or "on-thefly" basis, as devices that wish to communicate come within range of each other.

Some of the present distinctions between the wired and wireless world, visible to a user of the technology, include display size, power consumption, location determination, hardware capabilities, and support for charging models in which end-users can easily control their expenses. As technology continues to advance, users will expect the power and capabilities of the wireless networks to approach that of wired systems. Security will be increasingly important to both.

There are presently four significant proximate networking technologies for short-range wireless networking. The first wireless technology is referred to as IEEE 802.11, a wireless LAN standard from the Institute of Electrical and Electronics Engineers, Inc. A second wireless technology is referred to as HomeRF, a wireless standard from the HomeRF Working Group, Another standard is referred to as Bluetooth, available from the Bluetooth Group A standard referred to as IrDA is also available from the Infrared Data Association.

It is desirable to develop server appliance technology that provides e-commerce support to short-range wireless networks.

It is further desirable to develop user device-side abstractions and interfaces aimed to provide a wireless device user with a satisfying and productive experience.

It is desirable to develop and disseminate practical knowledge and expertise to reduce risks for subsequent development efforts.

It is also desirable to develop a multi-tiered system to support a wireless shopping application.

SUMMARY OF THE INVENTION

The present invention includes a method for providing user-apparent consistency in a wireless user device. An IP address, or other unique identifier, is assigned to a wireless user device in wireless communication with a wireless application server. The wireless communication may be any wireless communication, such as RF-based communication. The IP address is associated with a communication session between the wireless user device and the wireless application server. The IP address, along with information related to the communication session is stored, such as in an active session cache. The wireless user device may then rejoin the communication session in the event the wireless communication is temporarily dropped and re-established between the wireless user device and the wireless application server, without losing the assignment of the IP address to the wireless user device or any information stored for the IP address in the active session cache.

A state timeout value may be set for the communication session, containing the amount of time the wireless user device has to rejoin the communication session before the IP address is harvested. A connection to a back-end device may also be maintained during a communication session, independent of whether wireless communication is dropped. A communication session may be started when, for example, the wireless user device comes within range of a wireless antenna in communication with the wireless application server.

A server for wireless applications, or "wireless server", may be used to provide the infrastructure needed to enable the delivery of applications to short-range wireless devices. Typical applications requiring such delivery include commerce, personalization, and collaboration servers. Although the presentation of these back-end applications may be adapted to suit the display characteristics of a personal digital assistant ("PDA") or other wireless user device, there may be several areas of functionality that need to be addressed in order to provide a solid and effective user experience. It is often undesirable to repeatedly solve similar problems that may be inherent in multiple applications, such as problems relating to security, session preservation, for each of these back-end applications.

Some of the functionality that may be desired in a system in accordance with the present invention includes security and authentication, session and context management, proxy services, and home page and portal services. In order to provide adequate security and authentication, it may be necessary to provide a mechanism capable of authenticating the wireless device and performing automatic login capability to the back-end applications. It may also be necessary to provide storage for each username/password pair for all back-end applications.

Challenges in developing a system in accordance with the present invention include handling trust management for implicit personal data sharing, developing a framework for collaborative device applications, reducing the size and behavior of a logic or application server into an embeddable module, and developing advanced personalization to account for location, time, device, context, user expectations, and goals.

A primary architecture that may be used in accordance with the present invention is referred to as an "Edge PoP" architecture, a new second tier ("PoP tier") of wireless architecture that may work with a more traditional middleware tier. In this case, "PoP" refers to a "point of presence" approach. The wireless tier, or "PoP" tier, may be used to communicate with existing systems, such as commerce servers, and those components which may lie beyond the existing systems, such as legacy databases. A wireless user device, such as a PDA, may connect to a network relatively implicitly, assisted by the Edge PoP architecture. A user may, for example, simply push a wireless card into the PDA, the card including an antenna or antenna contact for use with a base station of a PoP tier. The wireless system may use a unique address, such as one built into ROM on the wireless card, to identify the PDA, which may be associated with a human identity.

In one embodiment, it may be possible for users to share PDAs by creating profiles. In such a case, the PoP tier may need to check the user login information on the PDA. The system may take advantage of this identification information to start a dialog with an existing server or system. The PoP tier may automatically start a dialog with the middleware tier, such as a commerce server tier.

Technologies may be utilized that support personalized interaction and content delivery with PDAs via short-range wireless networking, such as those using Bluetooth. The heart of the system may be a server such as WebLogic Server from BEA Systems, Inc. of San Jose, Calif. useful for wireless point of presence (PoP). This PoP may be used to handle: communication to/from PDAs, web-app authentication, proxying to back-end services, re-formatting content as necessary, location-based personalization, etc. For wireless access, an access server, such as that produced by Red-M may be used, as well as Bluetooth add-on cards for the PDAs. An appliance-like application server may be packaged with an access server to embody a wireless access PoP "appliance" solution. The PoP tier is, in one embodiment, a combination of a box provided by Red-M that utilizes Bluetooth, as well as a standard architecture Intel box with a WebLogic Server and other appropriate software, including a Linux operating system with a WAP Gateway. Another system could utilize similar components, but could include 802.11 wireless capability such as might be based on a Compaq Prism 802.11 chipset.

The establishment of a connection between a wireless user device and a PoP tier may be implicit. When the connection is established, there may be a handshake between the wireless device and the server connected to the base station. Using Bluetooth or another similar protocol, such as 802.11, the wireless PoP tier may know that the wireless device has established radio frequency (RF) contact. The system may then take advantage of the contact by beginning to query back-end servers for personalization information, based on the knowledge of the user and/or the user's identity. The user information may be pushed to the PoP server, implicitly or otherwise, at the time the link between the wireless device and the PoP tier is established. The credential information may be automatically pushed to the PoP tier, such that the PoP tier knows who the user is. The user information, such as a username/password pair, may be associated with the particular store or entity, as may be described or associated with a URL. A login or other appropriate mechanism could be used to authenticate the PDA user's identity.

A PoP tier may pull user information when a user comes within radio range of one of the system towers. The PoP tier may maintain state information across the radio connection, which may drop off and get re-established as radios are subject to interference and other problems. For instance, it may be possible to lose radio connection for seconds, or even minutes, by simply walking behind a metal cabinet, using an elevator, or entering a tunnel or subway station. In a system in accordance with the present invention, the state may remain persistent in these cases. A state timeout may be set, such that a state or session is maintained for a given time before the IP address is harvested and/or re-assigned. For example, an IP address may be harvested and a session terminated if a PDA is unavailable to the system for over thirty minutes. In order to provide a consistent user experience, it may be desirable that the user, as much as possible, not be able to tell that wireless connectivity dropped and was re-established. Protocols such as Bluetooth and 802.11 may provide the necessary components and programming for the hardware re-connection. It may, however, be up to the PoP tier to maintain session and state information, as well as to maintain the connection to the software or back-end servers.

A PoP tier may be responsible for the handing out of an IP address to a wireless user device. Since the distribution of addresses is controlled by the system, it may be ensured that the same IP address is not given out to a different device over some given period of time. The system may also control the length of that period of time. The IP address used may be a standard IP address, although other similar standards may be used or developed to accomplish the same goal. The system may not give out an IP address to anyone else until the information in that IP session has been harvested. If the user comes back into radio connection before the IP address and session information is harvested, the physical identifier of the device may enable associating information stored for that IP address, such that the user may rejoin the session at the point where the user left.

Figure 1:
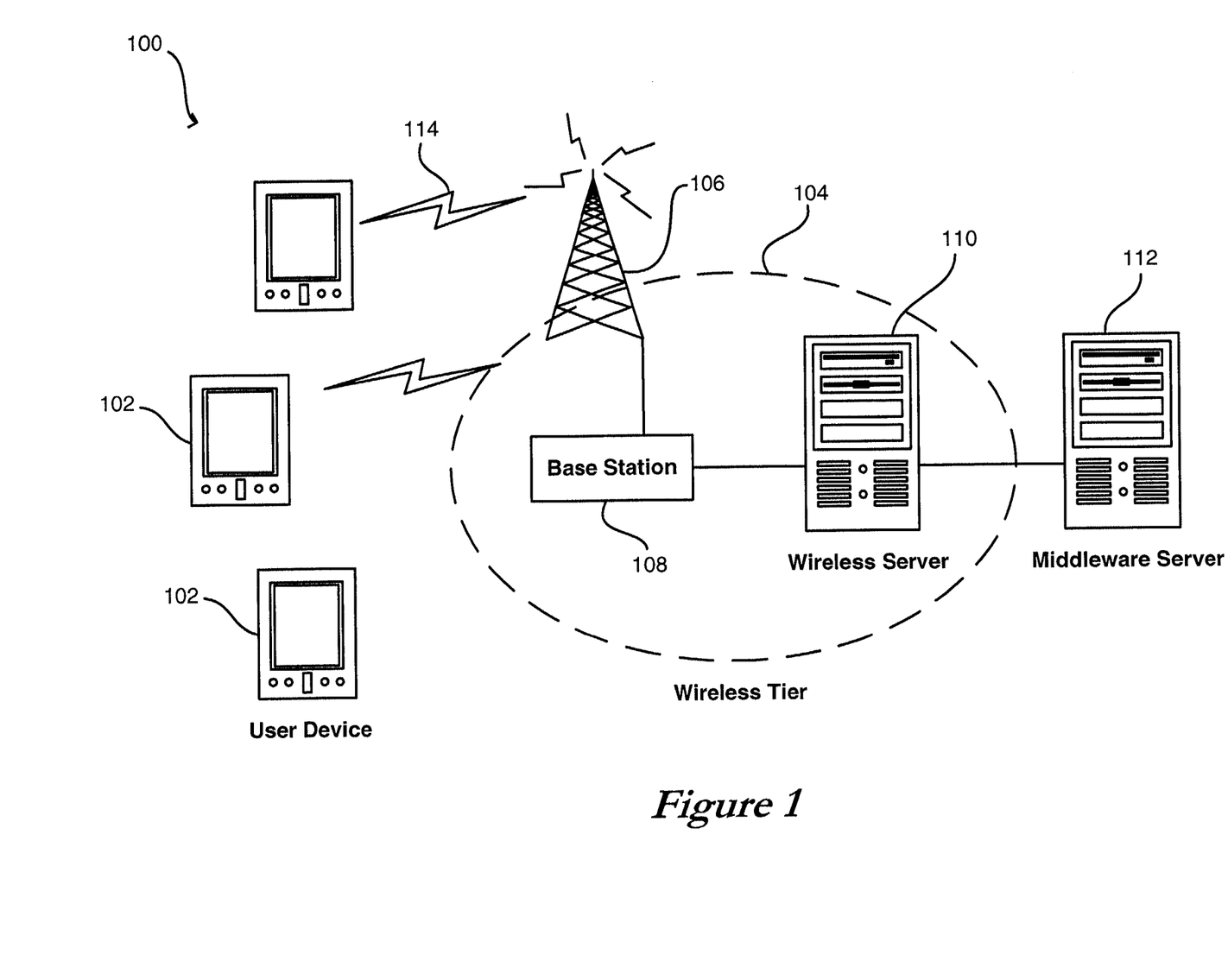
FIG. 1 is a diagram of a wireless system in accordance with one embodiment of the present invention.

FIG. 1 shows a high level view of a system 100 in accordance with one embodiment of the present invention. In the system, a wireless PoP tier 104 serves as the interface between the wireless user devices 102, such as Bluetooth-enabled personal data assistants (PDAs) using microbrowsers, and a middleware or back-end server 112, such as a commerce server. The wireless tier 104 includes a base station 108 adapted to communicate to the wireless user devices 102 through a remote antenna 106. The base station may comprise, for example, a Red-M AS3000 Bluetooth server or other similar server based on Bluetooth, 802.11, or other wireless technology. Alternatively, the base station and antenna may comprise a single unit. The wireless tier 104 also includes a wireless application server 110. The wireless application server may be any appropriate server, such as may utilize a Java-based or other language-based wireless enablement application, and may support security and authorization, session management, proxy services, and personalized portal services.

Figure 2:
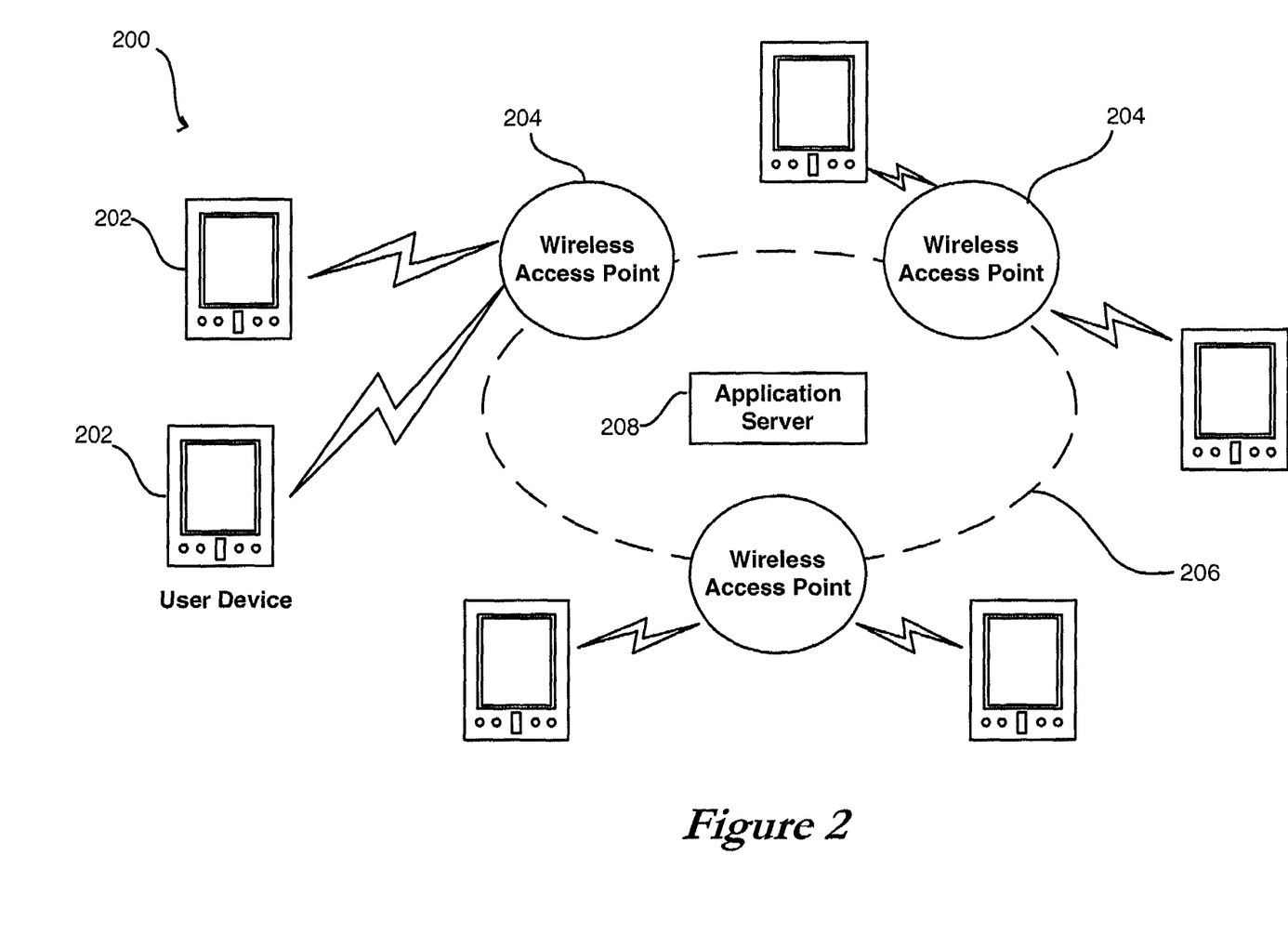
FIG. 2 is a diagram of an access perimeter of a system in accordance with one embodiment of the present invention.

As shown in the system 200 of FIG. 2, the wireless devices 202 may access the wireless tier 206 from any one of several wireless access points 204. Each access point may comprise an antenna connected to a single base station for the wireless tier, or an antenna and a base station dedicated to that antenna alone. Each wireless access point 204 is in communication with the wireless application server 208. In this system, it may be possible to determine the approximate location of a wireless device 202 by tracking the access point 204 being used to access the system 200, or by observing the relative signal strength at three or more non-colinear antennas.

Figure 3:
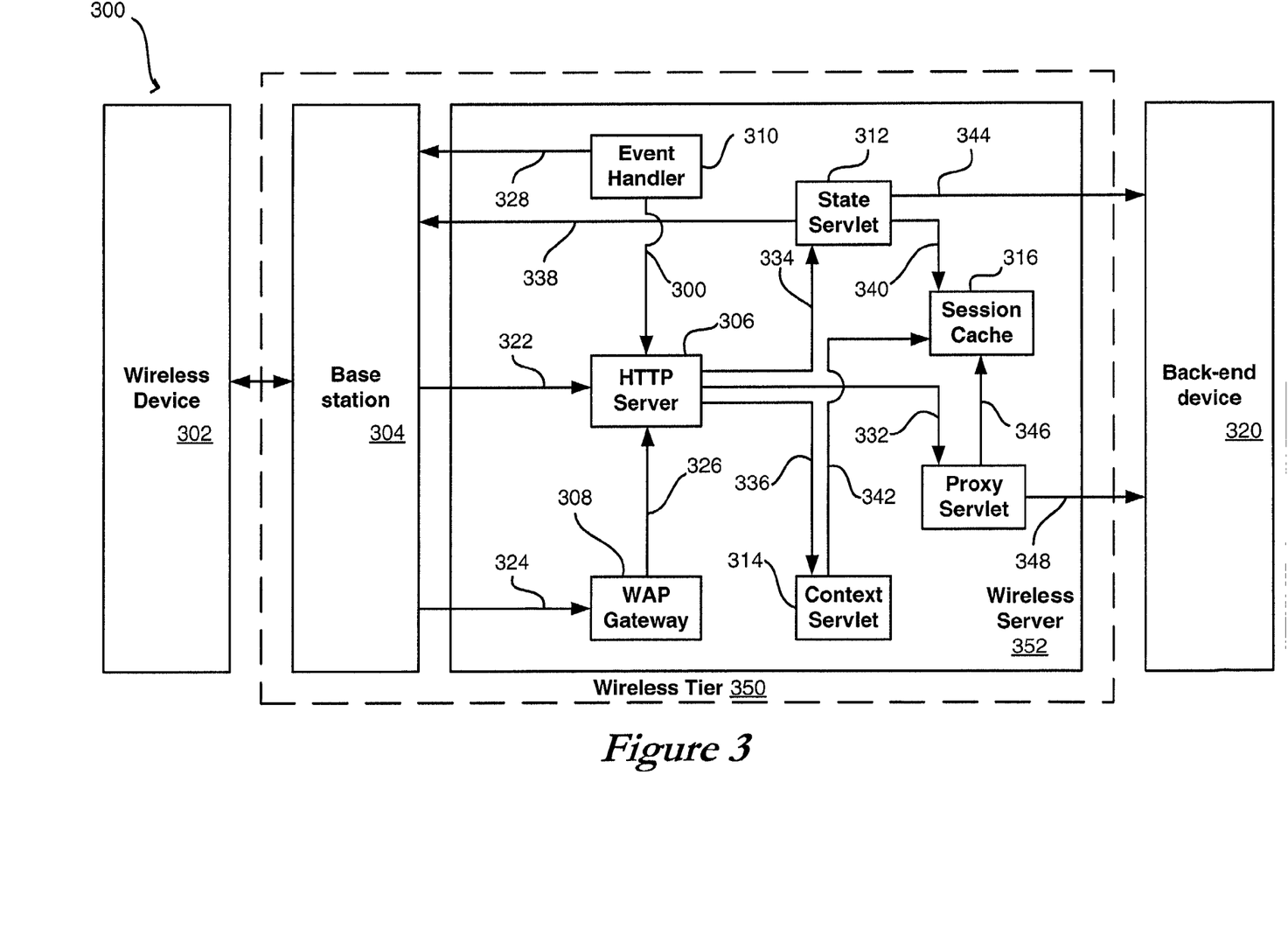
FIG. 3 is a diagram showing a communication flow for a wireless tier in accordance with one embodiment of the present invention.

A diagram of an application server 352 part of a system 300 including a wireless PoP tier 350, in accordance with one embodiment of the present invention, is shown in FIG. 3. In the Figure, a wireless device 302 is connected to a base station 304 of the wireless tier 350. Through the base station 304, the wireless device 302 may send a request, such as a browser request. If the request is a Wireless Application Protocol (WAP) browser request 324, it may be received by a WAP gateway 308, which may generates an HTTP proxy request 326 and sends it to the HTTP server 306. Alternatively, the wireless device 302 device may generate an HTTP browser proxy request 322 and send it directly to the HTTP server 306.

The system may include an event handler 310, which may poll 328 the wireless device 302 through the base station 304. The event handler may then send the events 330 to the HTTP server 306 via an HTTP request. Once the HTTP server has received a request, it may send a state request 334 to a state servlet 312, such as for implicit login/logout or location information. The HTTP server 306 may also send a proxy request 332 to a device proxy servlet 318, or a context request 336 to a context request handler servlet 314.

If a request is received by an event servlet 312, event information may be sent 340 to an active session cache 316, which may store such information as non-persistent cookies and context information. The event servlet 312 may also send an HTTP/LDAP "get" or "put" request 344 to the back-end device 320, such as to update or retrieve user profile data. The event servlet 312 may also need to send an HTTP request 338 to the wireless device 302 through the base station 304 to request context information.

A request received by a context servlet 314 may cause the generation of context information 342 that is sent to the active session cache 316. If a request is received by a proxy servlet 318, a proxied HTTP request 348 may be sent to the back-end device 320. Also, proxy information 346 may be sent to the active session cache 316.

Figure 4:
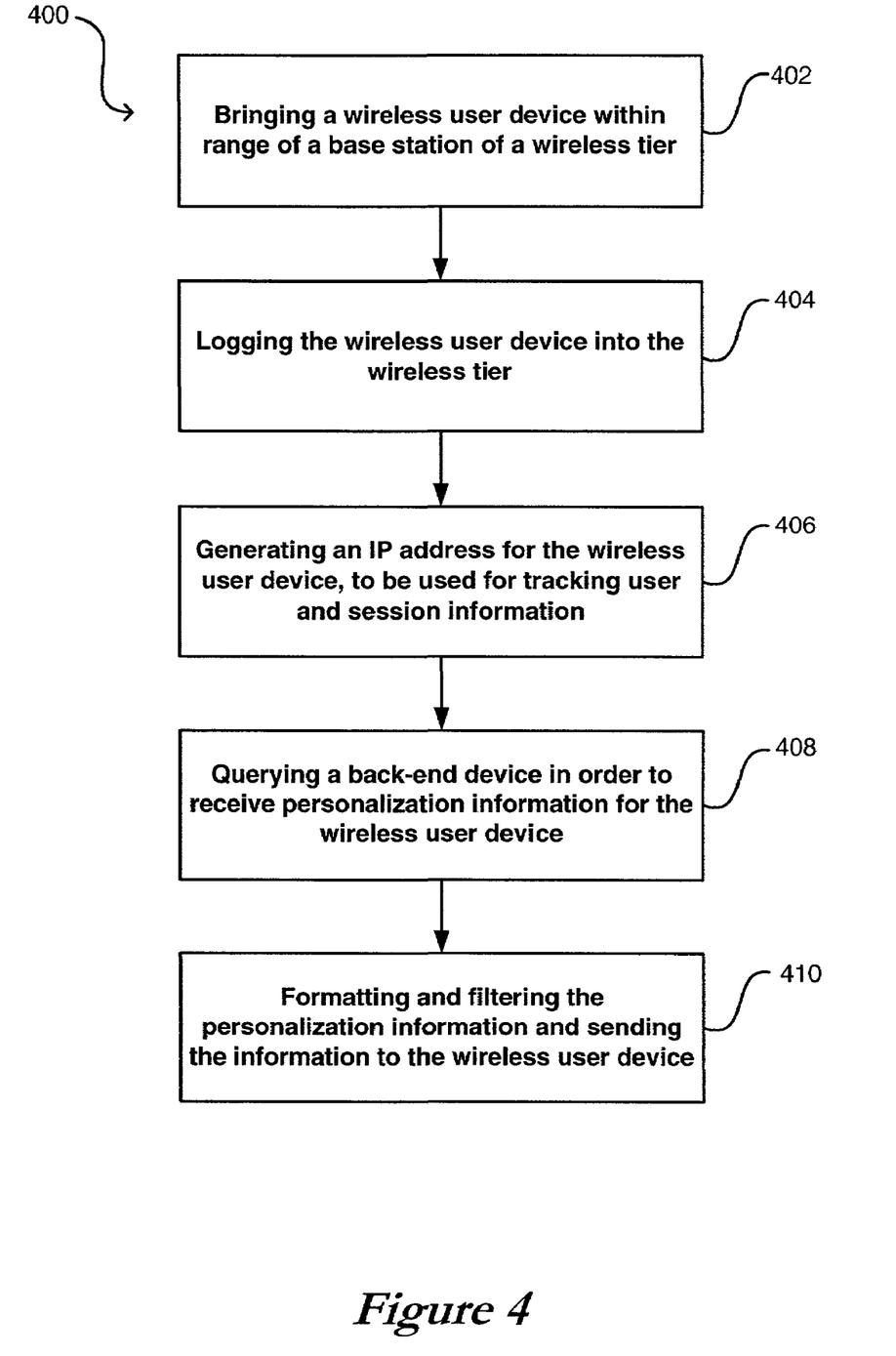
FIG. 4 is a flowchart for a wireless communication process in accordance with one embodiment of the present invention.

FIG. 4 shows a process 400 that may be used to send personalized information to a wireless user device, in accordance with one embodiment of the present invention. In the process, a user brings the wireless user device within range of a base station of a wireless tier 402. The wireless user device is then logged into the wireless application server of the wireless tier 404. The wireless application server generates an IP address for the wireless user device, to be used in tracking user and session information 406. The wireless application server then queries a back-end server in order to receive personalization information for the wireless device 408. The wireless application server formats and filters the personalization information, then sending it to the wireless user device 410.

Figure 5:
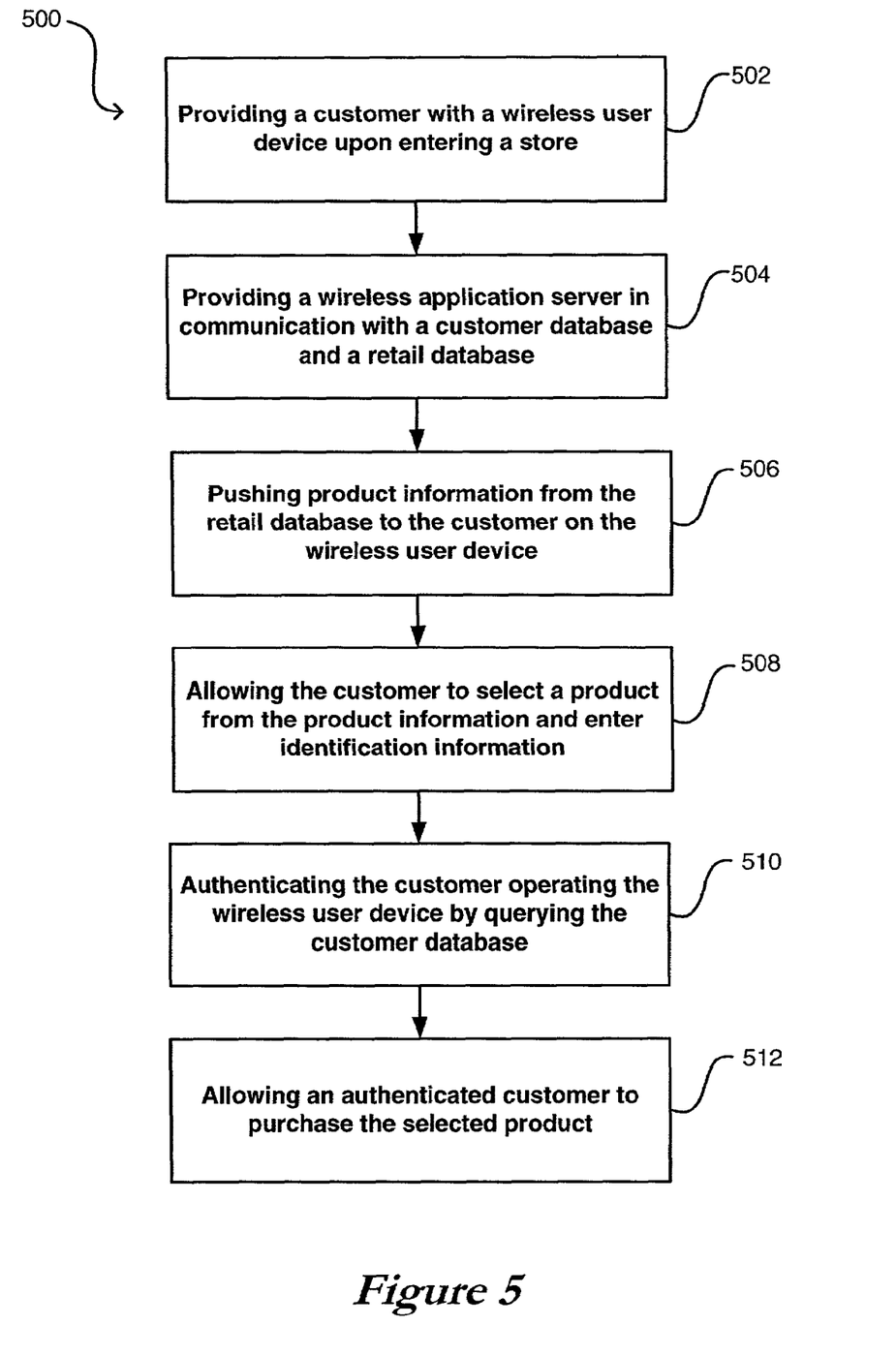
FIG. 5 is a flowchart for a wireless PoP server process in accordance with one embodiment of the present invention.

FIG. 5 shows another process 500 in accordance with one embodiment of the present invention, showing how a customer may use a wireless user device to enter into transactions in a store. A store may deliver a wireless user device to a customer entering the store 502. The store provides a wireless application server in communication with a customer database and a retail database, that is able to communicate via wireless communication with the wireless user device 504. The store may then push product information from the retail database to the customer on the wireless user device 506. The customer may select a product on the wireless user device and enter identification information 508. The store may then authenticate the customer operating the wireless user device by querying the customer database 510. If the user is authenticated, the store may then allow the customer to purchase the selected product.

A wireless server, or PoP server, may be embedded into a small server appliance. It may therefore be desirable to keep the footprint of the wireless server as small and simple as possible. One embodiment of a wireless server in accordance with the present invention is made up of JSP pages, Servlets, Tag Libraries, and JavaBean components, as are known and used in the art. For simplicity and lightness, it may be undesirable to use enterprise Java beans (EJBs). The configuration of the wireless server may instead utilize standard property files or XML configuration files.

The wireless server may act as a portal to a variety of applications. At a minimum, a page may be displayed with links to all available services. A form may be included to allow users to browse an arbitrary link, as well as to allow users to search and use other services.

A system in accordance with the present invention may also utilize location-based services, as discussed with respect to FIG. 2. Since the approximate location of a user may be known by determining the access point of that user into the system, location information may be translated and provided to the back-end services. Different location formats may be utilized, such as latitude/longitude, ZIP code, or street/building address. The wireless server may have enough flexibility to support any emerging standard for location representation, such as Global Positioning System (GPS) technology on the hand-held device.

The system access points may signal events by invoking HTTP requests on the wireless server. In the interim, these events may be written to a log file that is accessible through a remote file system, such as SMB/Samba. The job of the event handler may be to poll the log file for events and generate HTTP requests to the server.

The implementation of "walled gardens" and the use of proxy techniques in a wireless system may provide some design and/or performance trade-offs. A "walled garden" generally refers to an environment that controls access to content and services, such as may be available on the Internet, an ethernet, or a local area network (LAN). A walled garden may be used to restrict navigation for users or groups of users of a system within particular areas. This process may also be used to provide access to a specific selection of material or prevent access to other material.

One approach assumes that a proxy may always be placed on the path to the services of interest. The ability to rewrite URLs may not be relied upon in the content sent to the client device, so that subsequent "clicks" may be routed via the proxy. The client device application may be depended upon to use either an existing WAP gateway or HTTP proxy server. It may also be possible to force all packets to or from the access points to route via the server, where it may be possible to intercept, and proxy as desired, via a network stack.

An existing WAP gateway may be modified to send all back-end requests via the wireless server, which may then act as an HTTP proxy server. The use of a WAP gateway may provide at least two primary benefits. One such benefit is that all WAP traffic may be routed to the wireless server, regardless of content URLs. A second benefit is that the processing burden of the WAP gateway may be shifted from the underpowered access point or server to a higher-powered wireless server machine.

On an initial HTTP request, a proxy servlet may be used to provide an initial page, such as a personalized welcome page. If the initial request is for a site in a "walled garden," the proxy servlet may redirect to that site, such as after 3 seconds. A proxy servlet may also handle auto-logins to the back-end systems as the need arises. A proxy servlet may enforce policies regarding restriction of access to certain URLs. A proxy servlet may also provide any necessary content adaptation, such as adding a "Return to local site" link to a "foreign" page outside the garden, inserting advertising interstitials, limiting total transfer size, or filtering images.

Proxy services may be provided to fetch pages on behalf of a wireless user device or PDA. One advantage of such fetching is that a PDA browser, for example, may appear to the back-end systems as a reliable full featured browser, which might include SSL (Secure Socket Layer Protocol), cookies, advanced HTTP, etc., while actually supporting much less powerful browsers on the PDA. For SSL to be fully secure, however, would still require an equally secure connection between the proxy and the PDA. Other enabling functions that may be performed by the wireless server include asynchronous page download and wireless device overflow prevention. Transcoding of pages, or filtering and reformatting data so that it is formatted for the destination environment, may be supported.

Gateway or routing services may be useful, for example, if the wireless device does not talk HTTP over TCP/IP, or cannot query DNS (Domain Name System). Additionally, a wireless server may: gather and report statistics and usage patterns; cache content; perform accounting, quality of service (QoS), and auditing; detect intrusion/attack; and keep control of information flow ("walled garden"). Back-end services may be connected to the wireless server over secure/trusted lines, such as VPN, direct connect, etc.

An event servlet may be used to handle HTTP "event" requests. Events such as login and logout may be implicit from the user's perspective. When a PDA comes within antenna range, for example, a login negotiation sequence may begin automatically. When the connection is broken, a logout event may be signaled. A timer may also be started, including a system- or user-configurable timeout value. If a device connection is re-established within the timeout window, a previous session maintained by the wireless server may be rejoined. If the connection is not re-established within the timeout window, the wireless server may initiate an implicit logout that gathers any remaining usage data and clears the cache entry. One possible implication of these "sudden" or "implicit" logouts is that updates to a device state may need to be done immediately, as there may be no explicit opportunity for logout-time processing.

In one embodiment, only login and logout event support may be included. In another embodiment, coarse location update events may be included, such as moving from one antenna to another. Such location information may be accommodated via a pull, rather than a push approach.

For login events, the servlet may need to consult with an active session cache to determine if an existing session can be rejoined by a device, even if the device reappears with a different IP address. If the session cannot be rejoined, a new session may be built which includes context and user profile information fetched from a remote store. This store may be maintained on the client device, although a server-based alternative may be used. For some applications, user profile information may also be retrieved from back-end systems. To create a more responsive user experience, an initial personalized welcome screen may be assembled and cached at this time.

The implicit and automatic handling of logins to back-end systems may be desirable for at least three reasons. One possible reason is that the entering of data, such as usernames and passwords, may be difficult and error prone on hand-held devices, and services such as voice recognition may not help. Another possible reason is that users may not appreciate being asked to do things that machines typically do for them. A third reason is that the end-user's perception of responsiveness may be greatly improved by initiating a login when a new site or area is first entered, but doing so behind the scenes. This feature may greatly improve an end-user's perception of responsiveness.

A context request servlet may be used to handle requests for user context related information stored in an active session cache. As an example, back-end systems may learn the end-user's location and recent activities by making requests of this service. In a generic setting, the context servlet may track session duration as well as the number of page requests. In a more specific setting, the servlet may track recent locations and recent activities, such as purchases and product information requests. The servlet may also keep a cache on the device that works across administrative domains and enables user control.

In order to handle session and context management, session information may be maintained during connectivity lapses. To accomplish this, it may be desirable to store the information in a cookie, as may be known and understood in the art. PDAs and other wireless end devices, however, typically have less sophisticated browsers than desktops or laptops. These devices typically cannot support cookies, and have extreme limitations on the size of URLs that may be sent. It may still, however, be desirable to take advantage of some of the benefits of cookies while using the wireless devices. It is therefore necessary to track state information differently. In a wireless system in accordance with the present invention, cookies may be stored in the wireless tier on behalf of the wireless device for back-end applications.

A component such as a device proxy servlet may be used to manage cookies on behalf of a wireless device. Cookies may then be used to store user context information, such as the user's location recent activities, shopping list, etc.

In one embodiment of the present invention, the wireless tier may be used to cache cookies for the wireless devices by session. Since the wireless tier may be part of a securable computing domain, the tier may control the use of IP addresses by a device such as a temporally unique key in the time domain of interest. Such a key may be used to identify a device with a particular session and session state information.

In one embodiment of the present invention, the wireless PoP tier takes out the cookies from an incoming page (from the mid-tier or back-end) and stores them in a session cache. The cookies may be associated with state and session information for the particular IP address. The wireless tier may then send information back to the back-end server, including the cookies cached for that IP address, such that the back-end server may not realize it is not dealing with a standard client. This transparency may be possible because back-end systems typically authenticate users by means such as username and password pairs. The wireless tier in this case knows the username and password pair needed for the back-end, as well as the relevant IP address. The wireless tier may then be able to identify a user and associate the username and password by the unique IP address. It may then be possible for a wireless tier to represent a user to any number of different back-ends using any number of username and password pairs.

Cookie management may only deal with session cookies or user-specific cookies, not dealing with cookies stored across login sessions. In this case, it may make sense to handle the cookies as a cache, such as with domain name "tags", within a given end-user's entry in an active session cache.

Another feature that may be used in accordance with the present invention is content adaptation. Content adaptation may provide the opportunity to enhance the end-user experience, based upon information known at the wireless server. One example of this adaptation involves inserting a small message bar with navigation aids, such as text or icon links, in order to help return an end-user to a well-known "local" site inside the garden. These navigation aids may also act as indicators for useful new information, such as information that may inform a user that an instant message has arrived, may provide a link to a location relevant web-page, etc.

Another feature that may be implemented is the ability to rapidly display a brief interstitial page, such as may include an advertisement or other context related information, while a requested page is being fetched or generated by a back-end system. This may enhance the overall user experience by providing a source of new information instead of making the user stare at the same page while a new one is being downloaded. Such an interstitial page may be pre-staged in order to improve performance. When the requested page is finally displayed, it may include a small message bar which has been annotated to include a link to the interstitial page that was briefly displayed. This may allow a user to go back to the interstitial page at a later time if the user is so inclined. A further example of content adaptation may involve the filtering of large images or the conversion of suitably small images to a compressed format or wireless bitmap format (WBMP).

Pre-staging may be desirable in the wireless user device world, not only because of personalization functionality, but because of the extreme sensitivity to latency. PDA users, for example, may be less tolerant of long waits for responses while they tap on their PDAs than are users sitting at a desktop. These users may want to see something quickly. By doing the pre-staging of information, tapping on the PDA may enable a quick turn around and firing of the results back to the PDA, thereby creating a more pleasant user experience. Also, pre-staging may take into account known user navigation patterns, such as where a user viewing page X is 80% likely to view page Y next. Predicting navigation and pre-staging accordingly can greatly increase the user experience.

An active session cache may be used to maintain data that is useful in supporting a high-quality end-user experience for the duration of a wireless supported or enhanced activity. An example of such an experience, in a retail commerce scenario, may involve a trip to the mall. For an enterprise office scenario, the experience may include the duration of a continuous stay in an office environment. Due to the unpredictable nature of RF interference, or other wireless connection methods that may be used in accordance with the present invention, as well as the unpredictable nature of hand-held device usage, these experiences may span several establishments and breaks of network connectivity, leading to multiple implicit logins and logouts.

Much of the data may be organized relative to a given end-user session. Examples of such an organization include cookies, pre-staged web pages, access policies, filter and rewriting rules, login status for back-end systems, and user context information such as location, recent on-line activities, preferences, shopping lists and so forth. Other information, such as content pages, may be cached in a way that is sharable by all end-user sessions.

A personal information database (PID) may be used to store relevant user information. The PID may comprise a Wallet stored on the handheld device, as known and used in the art, or another appropriate data storage and retrieval system, that may contain passwords and possibly credit card information. A PID may also store such items such as shopping lists, preferences, or wish lists. The PID may comprise a cache, which is used to store historical information such as may relate to browsing, transaction, inquiry, and location history. Other historical information can be included, such as how often a product was viewed and/or whether the product was purchased. The PID may also comprise filters that may be used to prevent the receipt and/or viewing of unwanted ads and messages. A desktop application may be used to manage the information in the PID, which may be synced with the wireless device.

In addressing security, username/password pairs may be stored for the various back-end services. This information may be stored, for example, in a Wallet inside a PDA. A micro-server on the PDA may be used to serve the logins to a properly trusted wireless server. The Wallet may also track interests specified by the user, such as through a shopping list, wish list, or preference storage. The micro-server may serve this list to the appropriate wireless tiers. The micro-server, which may manage user logins and transactions, may be based on J2ME (Javam 2 Platform, Micro Edition available from Sun Microsystems, Inc. and so-called "kernel" or "micro" Java Virtual Machines (KVMs), as are known in the art. The wireless PoP may query the back-end commerce server to obtain items matching the user's wish list from the commerce server. The wireless PoP may also query the back-end commerce server to provide the user with information about an item and directions and methods to acquire the item. XML, HTTP, DTD, HTML schema, or other appropriate formats can be used to exchange information.

As an alternative, the login information may be stored in the wireless server as part of a user profile. In this case, it may also be possible for the wireless server to automatically generate a new username for a particular service if the user doesn't have one for that service. On the wireless server, information may be backed up, for example, onto a plain JDBC store. If this profile is stored on the PDA, it may be possible to do away with the wireless server's need for a backing store. This may be appropriate for a zero administration appliance, where the storage of data is distributed on the PDA.

One security model in accordance with the present invention employs the wireless access points to form a security perimeter, the access points being responsible for authenticating the wireless devices and users. As long as an end-user is able to unlock a wireless user device with a PIN number or similar security means, it may be assumed that the appropriate person is using the device.

As described above, any user/device login and logout events may be communicated to the wireless server. These events include, in one embodiment, the IP address assigned to the device as well as some token that uniquely identifies the end-user. Information regarding the communications link may also be included, such as effective up-stream and down-stream bandwidth, strength of encryption and so forth. One of the functions of a security perimeter may be to ensure that IP addresses are not "spoof-able". "Spoofing" occurs when a user, typically from outside the system, creates TCP/IP packets using another user's IP address. Further, the wireless server may be a PKI (Public Key Infrastructure) client that is capable of authenticating, encrypting, and digitally signing transactions with standard PKI protocols. Public Key Infrastructure is presently a popular approach that may allow people to exchange information and enter into business transactions with full confidence that the person on the other end of the exchange is actually the person with whom the user intends to deal. PKI may also ensure that exchanged information remains private and is not tampered with by anyone outside the transaction.

A user's browsing activities may be cached in a wireless device database. The user's transactions and location information may also be cached. A wireless tier may query the cache, in order to understand the user's previous behavior. In this instance, other items may be displayed to the user which may not be on the shopping list but may be of interest to the user, based on the previous behavior. It may be desirable to keep the cache as small as possible and up-to-date, due to the (at present) limited memory of a PDA. As the memory capabilities of PDAs increase, the minimizing of cached data may become less important.

In providing HTTP or other appropriate proxy services to back-end applications, any content adaptation that may be necessary for those applications (such as size cut-off, filter images, etc.) may also be provided. In order to provide home page and portal services, a start page may be provided, which may have links to various supported back-end applications ("walled garden," with exit gate). A personalized home page may also be created to contain personalization content and provide a "portal" to various applications and/or data.

A short-range wireless server may withstand frequent lapses in communication. A short-range wireless server may also handle the loss of application context, such as may occur when a PDA shuts down to conserve battery power or switch applications. It may be necessary for the wireless server to maintain session information during these connectivity lapses. To this effect, it may be desirable to keep a session or context for each user in memory, such as on a dedicated cache and aside from the regular HTTP session. In such a session, it may be possible to store external cookies, context information (such as location and recent activities), and the information required to present external systems with the appearance of session continuity. In fact, it may be possible to regularly "ping" the back-end servers in order to prevent expiration of HTTP sessions, in the event that the external timeouts are too low. "Pinging" a server means, in a generic sense, checking to determine whether a computer is currently connected to the Internet. A signal may be sent to an IP address, and if the signal comes back from the address, both the user's computer and the computer at the IP address are connected to the Internet.

By keeping information in a dedicated cache, such as in the wireless server's Java Virtual Machine (JVM) heap, it may be possible to retain total control of the information without having to comply with HTTP session limitations. Such a session limitation may require that PDA clients use cookies. If the identity of a user is known, as described above, then there may be no need for a cookie in order to recognize the user. It may in this case simply be possible to pull the relevant session from cache using the appropriate IP address.

A PDA's session or context may be pulled up from a memory cache, such as by using a unique key. In such a session, any and all information required by external systems may be stored, such as cookies, logins, and location information. Lapses in communication or PDA resets may not affect this session.

Since the identity of the user visiting the home page is known, personalized information may be provided. Users may be able to customize the pages by choosing those services which they want displayed. Possible personalization options include the ability to subscribe to content, such as alerts, news, or offers. Other personalization options may include the ability to use productivity applications, such as calendaring and "to-do" listing.

Some of the functionality described above may call for the storing of session information in-memory, but detached from a regular HTTP session. One way to accomplish this is to store all sessions on a global cache, such as may be held in Java Virutal Memory. A server foundation may be used, which may include a full-featured, high performance cache. Access to this cache may be done, for example, through a Java API or a JSP Tag library. Such access may provide for the writing of servlets and JavaBeans that access the cache, as well as simple JSPs that can read/write to the same cache. Additionally, the cache framework may include web-based administration pages to set the necessary properties and flush the cache when needed.

If an initial welcome screen or personalized web page is created and cached when signaled by the login event, the user may see an immediate response with a personalized web-page when the user is ready to enter the web experience. If the user's initial request is for a page other than a welcome page, the user may be redirected to the desired page after a slight delay. If the page request is for a foreign page, or a page outside of the "walled garden", the page may be rewritten before it is sent to the client device, such as to add a "Return to garden" link or icon at the top, bottom, or side of the display, or in a separate window.

A shopping list may also be pushed at the same time as the credential information, which may be stored on the PDA. The middleware tier may then go to the corporate store with the shopping list, run the list against the store's database, and come back to the user with a list of available items. The query may be run against the store. The information returned may be pulled back into the middle tier, and pre-staged or personalized for the end user, such as in a display of available items on the shopping list or in a personalized message.

It may be possible to store session and/or state information through the use of long URLs. This can have some benefit, such as anonymity. When using long URLs, a back-end device may not be able to track the IP address of the requesting device. This approach may cause some problems, however. In the wireless arena, URLs typically have to be short, so something may need to be done to compress the long URLs. It may then be necessary to rewrite all the URLs for the wireless device. This may require the system to monitor all information passing through in order to determine whether any URLs are included, and whether they need to be modified in any way.

It may be advantageous to put the processing power near the wireless devices in places like a shopping mall, where each store may be different than the one(s) next to it. In such a case, it may be possible for a wireless device to connect to several different entities (and therefore administrators and domains) while in the mall. A customer could pass from entity to entity while walking through the mall, for example, giving each entity the separate ability to push information to the customer. In another example, a mall could collect information from several of the stores renting space in the mall. In this way, once a customer enters the mall information could be pushed to the user for any of the stores. If the customer has a history of buying music, or has music items on a shopping list on the customer's PDA, the mall could push information relating to music stores in the mall, such as location or map information, current music sales, in-stock music items on the customer's shopping list, and suggestions for music selections similar to previous purchases made by the customer. The mall can choose to collect and/or track this information, but may prefer to use a PoP tier to aggregate services provided by mid-tier or back-end servers owned and/or supported by individual stores in and around the mall.

Ultimately, it may be possible for the system to handoff a device when it passes from one instance of a PoP tier to another. A certain amount of information, such as user identity, may be carried on a wireless device, as well as some personalization information. It may then be possible that, when a user goes between stores, some amount of what the user has done may pass to the next system simply by the user moving to that system.

One of the unique aspects to a system of the present invention includes the balancing of information. For instance, some information about a user may be useful to a merchant, such as buying habits and product preferences. This information may be controlled via the PoP tier. On the other hand, the user may wish to have control over certain user information. The user may choose to store this information on the PDA, for example, and only release it upon approval. This may include such information as credit card and social security numbers.

In one embodiment, a store may be able to implicitly receive the last 10 items or so that were purchased or viewed by the user. This may allow the store to present similar or related items to the user, in order to suggest items that may be more appropriate or desirable to the user. These may include, for example, accessories compatible with an item purchased by the user.

This sharing of historical information may, however, raise concerns regarding user privacy. The systems may therefore allow the user to have some control over the release of some or all such information. A user may be able to designate whether to release certain information to all parties or entities, certain parties or entities, only upon approval by the user, or never.

A user may also be allowed to provide a shopping list or other personalized information without providing information regarding the user's identity. In this manner, even though a user may be browsing anonymously, latency may still be improved. Also, a user may be able to receive information that is personalized on a certain level, without the sender knowing who the user is that is receiving the information. Anonymous use may not be appropriate for all situations, as a user may be unable to conduct a transaction or obtain the benefit of store loyalty status without manually entering identifying information.

A system may also contain a filtering module, such as may be located in the PoP tier and/or the wireless user device. Without filtering, a user may be bombarded with information from various wireless tiers with which the user comes into contact. A filtering module may be used to filter out information, based on, for example, system- or user-specified criteria. These criteria may include, but are not limited to, subject matter, keywords, IP address, black-listed wireless tiers, etc. From web pages to instant messages, all information from the wireless tiers may be configured to pass through the filtering module. Optionally, a user or system may choose to filter out only certain services or sources. Some users may prefer to use all these filtering options, as well as others, so that only desired, relevant information is shown to the user.

A balance may be reached between what the user may control in the wireless experience and what the merchant controls. For example, a user may wish to pull as few ads as possible, while a merchant may wish to push as many ads as possible. Filtering may allow the user to quickly make decisions regarding the user experience. For example, a user may be able to, by only a few simple clicks on a PDA, filter out all ads for a given day or only allow a certain number or type of advertisements from a merchant or merchants. In this way, a store may be able to push out as many ads as it wants without worrying about offending the user, as the user may have some control over what type and number of ads are received. Information may also be classified or given a priority level, such that a user may, for example, be able to filter out generic sales ads but may receive personalized messages from a merchant.

In implementing a wireless system in accordance with the present invention, it may not only be the security and privacy of the wireless device user that is at issue. It may also be undesirable for an entity or merchant to allow every wireless device user to access a particular back-end server. There may therefore be a first level of user authentication. In the first level of authentication, if an antenna or base station does not recognize an IP or identification number, it may not communicate with the wireless device. In a second level of authentication, a merchant may control the information that is implicitly pushed to, or pulled from, a back-end server. Different classes of user may be granted different privileges with respect to the sites they are allowed to visit. One embodiment includes an access policy enforcement module to enforce the policy. Such an enforcement module may be designed to work with an external access policy manager, such as by using a product such as AuthAPI available from DASCOM Inc., or may work with its own simple access policy rule base.

A user may also wish to control the information that is implicitly pushed to connected back-ends. For example, a user may not wish to communicate with a particular entity or merchant. A user may be in an open environment such as a shopping mall, for example, where the user may not care if, or may prefer that, information is automatically pushed to any system in range. Alternatively, the user may not wish for information to be pushed to specific stores in the mall, or may wish to push information only to specific stores. In any case, the PoP tier may store a username, password, and URL for any of these entities or merchants after an initial handshake. The PoP tier may then implicitly send information to these back-ends.

The wireless tier may be configured to only send information implicitly to those entities with which the user has a relationship. If the entity is not on a list to receive information implicitly, the wireless device may either send information explicitly, prompt the user for a decision on whether to send information, or ignore the entity and not send any information at all. These options may be specified by the user, such as in system settings. In one embodiment, information is pushed only if (1) the credentials provided by the back-end server are sufficient, and (2) the user's personal policy and settings permit sending the information.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for providing user-apparent consistency in a wireless user device, comprising:
    assigning an IP address to a wireless user device in wireless communication with a wireless application server, the IP address associated with a communication session between the wireless user device and the wireless application server;
    retrieving user context information associated with the profile of a user of the wireless device from a remote store;
    storing the IP address and the user context information related to the communication session in an active session cache;
    maintaining the user context information in the active session cache during connectivity lapses between the wireless user device and the wireless application server such that the user context information does not need to be retrieved again from the remote store at reconnection; and
    allowing the wireless user device to rejoin the communication session, in the event the wireless communication is temporarily dropped and re-established between the wireless user device and the wireless application server, without losing the assignment of the IP address to the wireless user device or any information stored for the IP address in the active session cache;
    wherein the wireless user device rejoins the communication session implicitly from the user's perspective thereby providing an appearance of session continuity.

2. A method according to claim 1, further comprising:
setting a state timeout value containing the amount of time the wireless user device has to rejoin the communication session before the IP address is harvested.

3. A method according to claim 1, further comprising:
harvesting the P address at the end of the communication session.

4. A method according to claim 1, further comprising:
terminating the communication session.

5. A method according to claim 1, further comprising:
maintaining a connection to a back-end device during a communication session, independent of whether the wireless communication is dropped.

6. A method according to claim 1, further comprising:
ensuring an IP address is not given out to another wireless user device during a communication session.

7. A method according to claim 1, further comprising:
beginning and ending a communication session with a request from an event servlet.

8. A method according to claim 1, further comprising:
beginning a communication session when the wireless user device comes within range of a wireless antenna in communication with the wireless application server.

9. A method according to claim 1, further comprising:
storing context information for the communication session in the active session cache.

10. A method according to claim 1, further comprising:
handling requests for context information stored in the active session cache with a context request servlet.

11. A method according to claim 1, further comprising:
maintaining a communication session when the wireless communication passes from one wireless antenna in communication with the wireless application server to another wireless antenna in communication with the wireless application server.

12. A method according to claim 1, further comprising:
storing information relating to the communication session in a cookie on the wireless application server.

13. A method for providing user-apparent consistency in an RF-based wireless user device, comprising:
    assigning an IP address to a wireless user device in RF-based communication with a wireless application server, the IP address associated with a communication session between the wireless user device and the wireless application server;
    retrieving user context information associated with the profile of a user of the wireless device from a remote store;
    storing the IP address and the user context information related to the communication session in an active session cache;
    maintaining the user context information in the active session cache during connectivity lapses between the wireless user device and the wireless application server such that the user context information does not need to be retrieved again from the remote store at reconnection; and
    allowing the wireless user device to rejoin the communication session, in the event the RF-based communication is temporarily dropped and re-established between the wireless user device and the wireless application server, without losing the assignment of the IP address to wireless user device or any information stored for the IP address in the active session cache.

14. A method according to claim 13, further comprising: setting a state timeout value containing the amount of time the wireless user device has to rejoin the communication session before the IP address is harvested.

15. A method according to claim 13, further comprising: harvesting the IP address at the end of the communication session.

16. A method according to claim 13, further comprising: terminating the communication session.

17. A method according to claim 13, further comprising: maintaining a connection to a back-end device during a communication session, independent of whether the wireless communication is dropped.

18. A method according to claim 13, further comprising: ensuring an IP address is not given out to another wireless user device during a communication session.

19. A method according to claim 13, further comprising: beginning and ending a communication session with a request from an event servlet.

20. A method according to claim 13, further comprising: beginning a communication session when the wireless user device comes within range of a wireless antenna in communication with the wireless application server.

21. A method according to claim 13, further comprising: storing context information for the communication session in the active session cache.

22. A method according to claim 13, further comprising: handling requests for context information stored in the active session cache with a context request servlet.

23. A method according to claim 13, further comprising: maintaining a communication session when the wireless communication passes from one wireless antenna in communication with the wireless application server to another wireless antenna in communication with the wireless application server.

24. A method according to claim 13, further comprising: storing information relating to the communication session in a cookie on the wireless application server.

25. A method for providing user-apparent consistency in a wireless user device, comprising:
   starting a wireless communication session between a wireless user device and a wireless application server;
   assigning an identifier to the wireless communication session;
   retrieving user context information associated with the profile of a user of the wireless device from a remote store;
   storing the identifier and the user context information related to the wireless communication session on the wireless application server such that a wireless user device may rejoin the wireless communication session without losing the information related to the wireless communication session, in the event wireless communication is temporarily dropped and re-1established between the wireless user device and the wireless application server;
   wherein the information related to the wireless communication session is stored on the wireless application server in an active session cache and maintained there during any connectivity lapses between the wireless user device and the wireless application server.

26. A method according to claim 25, further comprising: maintaining a connection to a back-end device during the wireless communication session, independent of whether wireless communication is dropped.

27. A method according to claim 25, further comprising: starting the wireless communication session when the wireless user device comes within range of a wireless antenna in communication with the wireless application server.

28. A method according to claim 25, further comprising: handling requests for context information with a context request servlet.

29. A method according to claim 25, further comprising: maintaining a wireless communication session when wireless communication passes from one wireless antenna in communication with the wireless application server to another wireless antenna in communication with the wireless application server.

30. A method according to claim 25, further comprising: storing information relating to the communication session in a cookie on the wireless application server.

31. A method for providing user-apparent consistency for wireless communications on a Personal Digital Assistant, comprising:
   logging a user of a Personal Digital Assistant into a wireless application server when the Personal Digital Assistant comes within range of a wireless antenna in communication with the wireless application server;
   assigning a unique identifier to the Personal Digital Assistant in wireless communication with the wireless application server, the unique identifier associated with a communication session between the Personal Digital Assistant and the wireless application server;
   retrieving user context information associated with the profile of the user of the Personal Digital Assistant from a remote store;
   storing the unique identifier and the user context information related to the communication session in an active session cache on the wireless application server;
   maintaining the user context information in the active session cache during connectivity lapses between the Personal Digital Assistant and the wireless application server such that the user context information does not need to be retrieved again from the remote store at reconnection; and
   allowing the Personal Digital Assistant to rejoin the communication session in the event the wireless communication is temporarily dropped and re-established between the Personal Digital Assistant and the wireless application server, without losing the assignment of the unique identifier to the Personal Digital Assistant or any information stored for the unique identifier in the active session cache.

* * * * *

UNITED STATES PATENT AND TRADEMARK OFFICE
CERTIFICATE OF CORRECTION

PATENT NO. : 7,117,266 B2  Page 1 of 1
APPLICATION NO. : 09/949,912
DATED : October 3, 2006
INVENTOR(S) : Dan Fishman et al.

It is certified that error appears in the above-identified patent and that said Letters Patent is hereby corrected as shown below:

Column 16, line 6:
Delete "the P address" and insert --the IP address--.

Column 17, line 54:
Delete "and re-1established" and insert --and re-established--.

Signed and Sealed this

Nineteenth Day of December, 2006

JON W. DUDAS
*Director of the United States Patent and Trademark Office*